United States Patent
Mizuta

(10) Patent No.: US 8,976,232 B2
(45) Date of Patent: Mar. 10, 2015

(54) DEVICE AND METHOD FOR ADJUSTING PARALLAX, IMAGING APPARATUS, AND IMAGE REPRODUCTION DEVICE

(71) Applicant: FUJIFILM Corporation, Tokyo (JP)

(72) Inventor: Tomoyuki Mizuta, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/264,490

(22) Filed: Apr. 29, 2014

(65) Prior Publication Data

US 2014/0232833 A1 Aug. 21, 2014

Related U.S. Application Data

(63) Continuation of application No. PCT/JP2012/077453, filed on Oct. 24, 2012.

(30) Foreign Application Priority Data

Oct. 31, 2011 (JP) .................................. 2011-238572

(51) Int. Cl.
*H04N 13/00* (2006.01)
*H04N 13/02* (2006.01)
*G03B 35/08* (2006.01)

(52) U.S. Cl.
CPC ............ *H04N 13/0022* (2013.01); *G03B 35/08* (2013.01); *H04N 13/0239* (2013.01); *H04N 13/0271* (2013.01); *G03B 2205/0092* (2013.01)
USPC .......................................................... 348/49

(58) Field of Classification Search
USPC ........................................................... 348/49
See application file for complete search history.

(56) References Cited

FOREIGN PATENT DOCUMENTS

| JP | 5-288532 A | 11/1993 |
|----|------------|---------|
| JP | 8-9421 A | 1/1996 |
| JP | 8-251625 A | 9/1996 |
| JP | 10-155104 A | 6/1998 |
| JP | 2007-288229 A | 11/2007 |
| JP | 2011-209634 A | 10/2011 |

(Continued)

OTHER PUBLICATIONS

International Search Report, issued in PCT/JP2012/077453, dated Jan. 29, 2013.
Written Opinion of the International Search Authority, issued in PCT/JP2012/077453, dated Jan. 29, 2013.

(Continued)

*Primary Examiner* — Andy Rao
*Assistant Examiner* — Tyler Edwards
(74) *Attorney, Agent, or Firm* — Birch, Stewart, Kolasch & Birch, LLP

(57) ABSTRACT

A distance determining section increases a convergence point distance by a distance proportionate to an operation of an up key. The distance determining section reduces the convergence point distance by a distance proportionate to an operation of a down key. A target convergence point distance is incremented by 1 m per pressing operation of the up key. The target convergence point distance is decremented by 1 m per pressing operation of the down key. A shift amount setting section converts the target convergence point distance into a shift amount that corresponds to the target convergence point distance. The shift amount is set to an image shifting section. The image shifting section shifts each cut out region by the shift amount from a reference position and cuts out viewpoint images with the cut out regions from original left and right viewpoint images. Thus, the parallax-adjusted viewpoint images are produced.

14 Claims, 12 Drawing Sheets

(56) References Cited

FOREIGN PATENT DOCUMENTS

| | | |
|---|---|---|
| WO | WO 2006/016534 A1 | 2/2006 |
| WO | WO 2006016534 A1 * | 2/2006 |

OTHER PUBLICATIONS

English translation of the International Preliminary Report on Patentability mailed May 1, 2014, issued in PCT/JP2012/077453 (Forms PCT/IB/338 and PCT/IPEA/409).

* cited by examiner

DEVICE AND METHOD FOR ADJUSTING PARALLAX, IMAGING APPARATUS, AND IMAGE REPRODUCTION DEVICE

CROSS REFERENCE TO RELATED APPLICATIONS

This non-provisional application is a Continuation of International Application No. PCT/JP2012/077453 filed on Oct. 24, 2012, which claims the benefit of Japanese Application No. 2011-238572 filed in Japan on Oct. 31, 2011. The entire contents of all of the above applications are hereby incorporated by reference.

BACKGROUND OF THE INVENTION

1. Field of the invention

The present invention relates to a device and a method for adjusting parallax, an imaging apparatus, and an image reproduction device which are used for image capture and reproduction of stereoscopic images.

2. Description Related to the Prior Art

Digital cameras (hereinafter referred to as the 3D cameras) which are used for producing stereoscopic images are known. The 3D camera has a pair of left and right imaging sections. The imaging sections capture images of a subject simultaneously from respective left and right viewpoints. Thereby a left viewpoint image and a right viewpoint image are obtained. The left viewpoint image and the right viewpoint image constitute a parallax image. The 3D camera is provided with an LCD for displaying a reproduced or captured parallax image. The LCD displays a through image during imaging. Of the parallax image displayed on the LCD, the left viewpoint image is observed with the left eye of an observer and the right viewpoint image is observed with the right eye of the observer. Thereby, the parallax image is viewed stereoscopically.

It is easy to stereoscopically view the parallax image when the subject to be viewed has small parallax. As for methods for adjusting parallax, methods for changing the inclination of an optical axis of an imaging system and thereby increasing or reducing a convergence angle and methods for shifting a viewpoint image and thereby increasing or reducing the convergence angle are known (for example, see Japanese Patent Laid-Open Publication Nos. 08-251625 and 10-155104). For example, there are methods for translating image sensors and methods for translating cut out regions, which are cut out from the captured images to be used as the viewpoint images.

A minimum unit of a shift amount for shifting the viewpoint image at the time of the image capture is a pitch of pixels (light receiving elements) on a light receiving surface of the image sensor. However, a change in a distance (hereinafter referred to as the convergence point distance) to a convergence point at which the parallax is "0" is not constant even if the shift amount of the viewpoint image is increased or reduced by one pixel. The greater the convergence point distance, the greater the change amount of the convergence point distance relative to the shift amount of one pixel. The smaller the convergence point distance, the smaller the change amount of the convergence point distance relative to the shift amount of one pixel. Hence, when the shift amount of the viewpoint image is increased or reduced, for example, by a unit of pixel while a parallax image on an LCD or the like is viewed stereoscopically, stereoscopic effect of the parallax image being observed may be changed abruptly on a far distance side even if the viewpoint image is shifted based on a constant operation amount. The operation amount on the near distance side significantly differs from that on the far distance side, so that the observer may feel discomfort with a change in display in response to the operation and the operation may become difficult.

SUMMARY OF THE INVENTION

An object of the present invention is to provide a device and a method for adjusting parallax, an imaging apparatus, and an image reproduction device for suppressing an abrupt change in stereoscopic effect at the time of parallax adjustment and eliminating discomfort caused by a change in display in response to operation.

In order to achieve the above and other objects, the parallax adjustment device according to the present invention comprises a first operation unit, a distance determining section, a shift amount setting section, and an image shifting section. The first operation unit outputs a first operation signal based on an amount of operating the first operation unit. The distance determining section determines a target convergence point distance based on the first operation signal. The target convergence point distance is determined by increasing or reducing a current convergence point distance by a distance proportionate to the amount of operating the first operation unit. A convergence point distance is a distance to a convergence point at which no parallax is caused. The shift amount setting section sets a shift amount of each viewpoint image such that an amount to be shifted per unit amount of operating the first operation unit is nonlinearly increased or reduced in a direction of parallax of the each viewpoint image in accordance with a distance change from the current convergence point distance to the target convergence point distance. The image shifting section shifts the each viewpoint image by the shift amount and thereby changes the parallax.

It is preferable that the parallax adjustment device further comprises a change amount display section for displaying an amount of change in the convergence point distance relative to the unit amount of operating the first operation unit. It is preferable that an amount of change in the distance to increase the distance differs from an amount of change in the distance to reduce the distance. The amount of change in the distance is determined by the distance determining section.

It is preferable that the parallax adjustment device further comprises a second operation unit and a shift amount increasing/reducing section. The second operation unit outputs a second operation signal based on an amount of operating the second operation unit. The shift amount increasing/reducing section changes the shift amount by a unit of pixel, in proportion to the amount of operating the second operation unit based on the second operation signal.

An imaging apparatus according to the present invention comprises the above-described parallax adjustment device and an imaging section for capturing a first viewpoint image and a second viewpoint image.

It is preferable that the imaging apparatus further comprises a zoom lens, a focal length obtaining section, a shift amount increasing/reducing section, and input controller. The zoom lens is used for capturing the first viewpoint image and the second viewpoint image and provided in the imaging section. The focal length obtaining section obtains a focal length of the zoom lens. The shift amount increasing/reducing section changes the shift amount by a unit of pixel, in proportion to the amount of operating the first operation unit based on the first operation signal. The input controller inputs the first operation signal to the distance determining section in a case where the focal length obtained by the focal length obtaining section is less than or equal to a predetermined focal length and inputs the first operation signal to the shift amount increasing/reducing section in a case where the focal length is greater than the predetermined focal length.

It is preferable that the imaging apparatus further comprises a subject distance obtaining section, a shift amount increasing/reducing section, and an input controller. The subject distance obtaining section obtains a subject distance. The shift amount increasing/reducing section changes the shift amount by a unit of pixel, in proportion to the amount of operating the first operation unit based on the first operation signal. The input controller inputs the first operation signal to the distance determining section in a case where the subject distance obtained by the subject distance obtaining section is less than or equal to a predetermined subject distance and inputting the first operation signal to the shift amount increasing/reducing section in a case where the subject distance is greater than the predetermined subject distance.

It is preferable that the imaging apparatus further comprises a shift amount increasing/reducing section and an input controller. The shift amount increasing/reducing section changes the shift amount by a unit of pixel, in proportion to the amount of operating the first operation unit based on the first operation signal. The input controller inputs the first operation signal to the distance determining section in a case where a convergence point distance at the time of operating the first operation unit is less than or equal to a predetermined convergence point distance and inputting the first operation signal to the shift amount increasing/reducing section in a case where the convergence point distance at the time of operating the first operation unit is greater than the predetermined convergence point distance.

It is preferable that the imaging apparatus further comprises a second operation unit and a shift amount increasing/reducing section. The second operation unit outputs a second operation signal based on an amount of operating the second operation unit. The shift amount increasing/reducing section changes the shift amount by a unit of pixel, in proportion to the amount of operating the second operation unit based on the second operation signal.

It is preferable that the imaging apparatus further comprises a change amount display section for displaying an amount of change in the convergence point distance relative to the unit amount of operating the first operation unit.

It is preferable that the image shifting section shifts a cut out region by the shift amount in the direction of parallax within each of original viewpoint images captured with the imaging section and cuts out the each cut out region and thereby produces each viewpoint image with adjusted parallax.

It is preferable that the imaging apparatus further comprises a display section for displaying a through image in 3D, with the use of the each viewpoint image with the parallax adjusted by the image shifting section.

An image reproduction device according to the present invention comprises the above-described parallax adjustment device and a display section for displaying the each viewpoint image in 3D with the parallax adjusted by the image shifting section.

A method for adjusting parallax according to the present invention comprises a distance determining step, a shift amount setting step, and an image shifting step. In the distance determining step, a target convergence point distance is determined based on a first operation signal. The target convergence point distance is determined by increasing or reducing a current convergence point distance by a distance proportionate to an amount of operating a first operation unit. The first operation signal is outputted from the first operation unit based on the amount of operating the first operation unit. A convergence point distance is a distance to a convergence point at which no parallax is caused. In the shift amount setting step, a shift amount of each viewpoint image is set such that an amount to be shifted per unit amount of operating the first operation unit is nonlinearly increased or reduced in a direction of parallax of the each viewpoint image in accordance with a distance change from the current convergence point distance to the target convergence point distance. In the image shifting step, the each viewpoint image is shifted by the shift amount, which is determined in the shift amount setting step, and thereby the parallax is changed.

According to an aspect of the present invention, the convergence point distance is increased or reduced in proportion to the operation amount of the first operation unit. Hence, the stereoscopic effect of the parallax image does not change abruptly when the parallax is adjusted. Thereby an operation amount of the parallax adjustment is not extremely large on the near distance side. A change in the convergence point distance which corresponds to the operation amount is not large on the far distance side. As a result, discomfort caused by a change in display in response to the operation is avoided.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

[First Embodiment]

Figure 1:
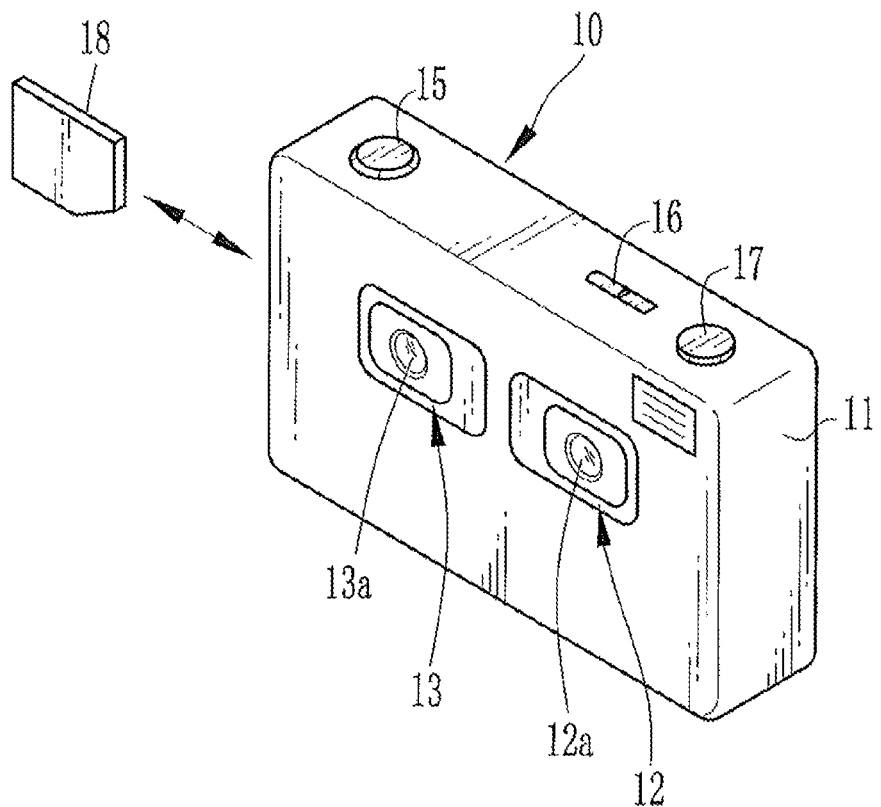
FIG. 1 is a front perspective view of a 3D camera incorporating a parallax adjustment device of the present invention.
Figure 2:
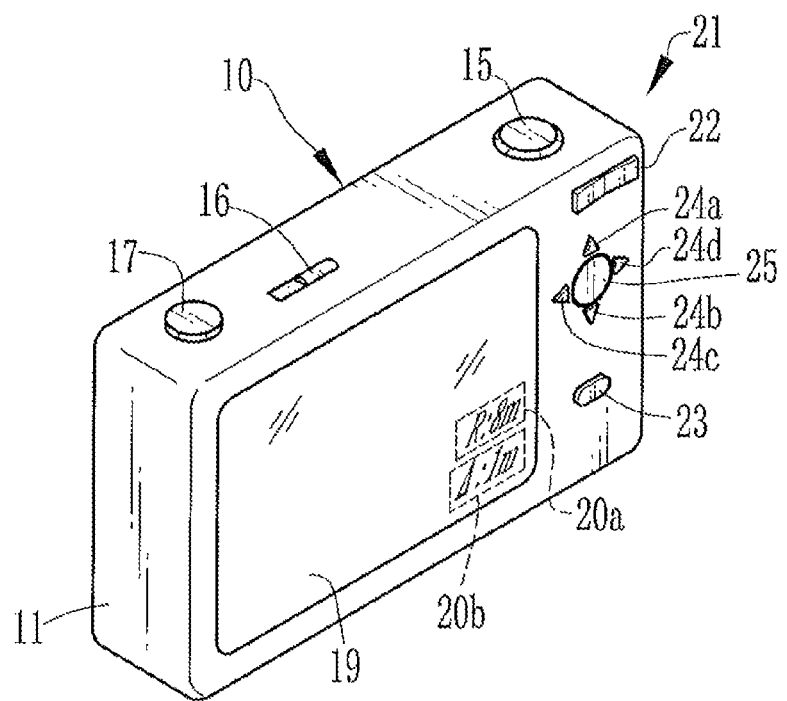
FIG. 2 is a back perspective view of the 3D camera.

In FIGS. 1 and 2, a 3D digital camera (hereinafter referred to as the 3D camera) 10 comprises a camera body 11, left and right imaging systems 12 and 13 on the front of the camera body 11, a taking lens 12a of the left imaging system 12, and a taking lens 13a of the right imaging system 13. The left imaging system 12 captures a left viewpoint image. The right imaging system 13 captures a right viewpoint image. The left viewpoint image and the right viewpoint image constitute a parallax image.

The taking lenses 12a and 13a are spaced apart by a predetermined distance in a left-right direction. Each of the taking lenses 12a and 13a is a zoom lens and changes a focal length between a telephoto end and a wide-angle end.

A shutter release button 15, a power switch 16, and a mode dial 17 are disposed on a top face of the camera body 11. A card slot (not shown) is provided on the side of the camera body 11. A memory card 18 is inserted into the card slot in a detachable manner.

An operation of the mode dial 17 switches the mode between an imaging mode and a reproduction mode. In the imaging mode, a parallax image is captured. In the reproduction mode, the parallax image is reproduced and displayed. When the shutter release button 15 is pressed in the imaging mode, each of the imaging systems 12 and 13 is activated and a parallax image is captured. The captured parallax image is recorded in the memory card 18.

Figure 3:
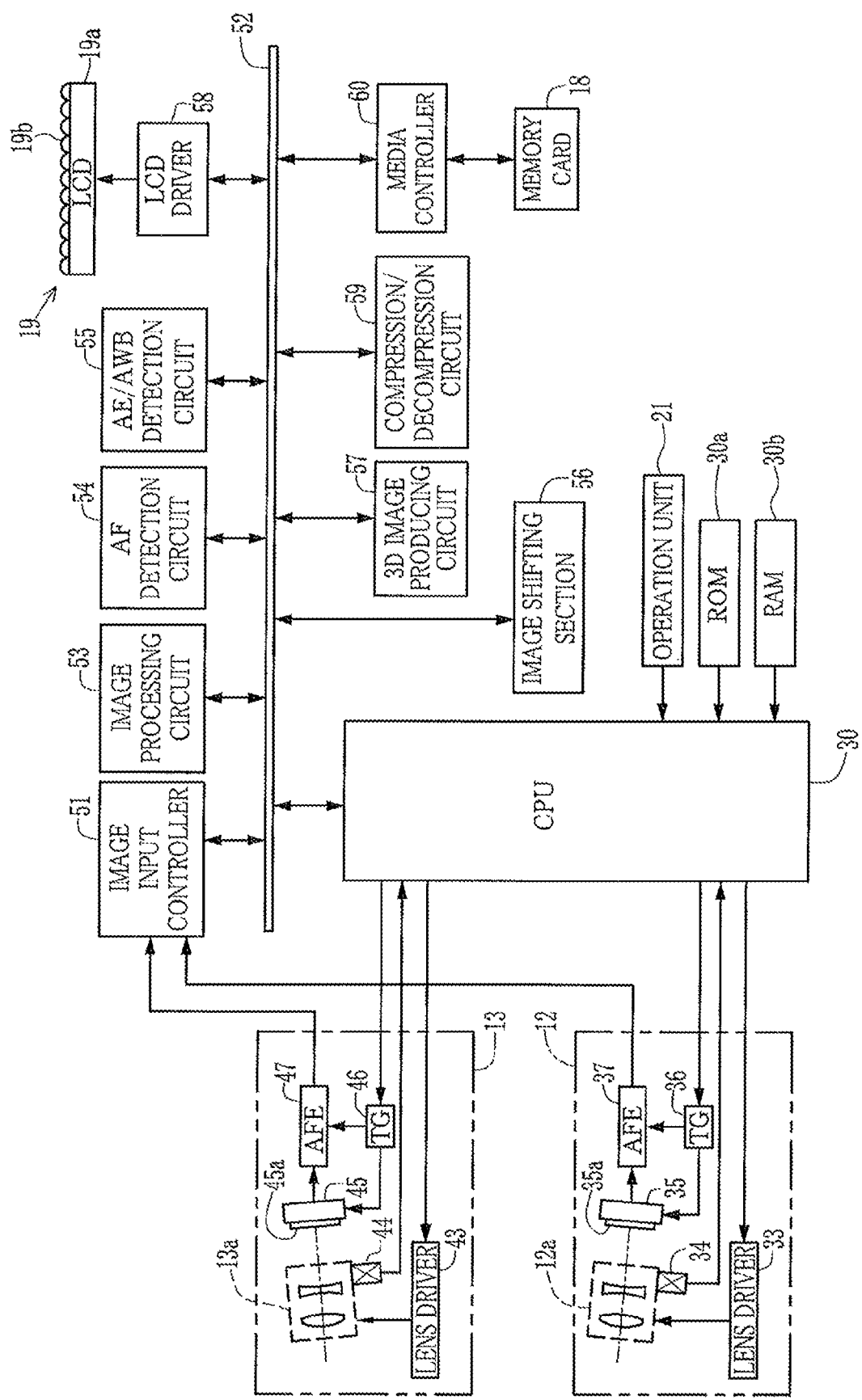
FIG. 3 is a block diagram of the 3D camera.

A display 19 is provided on the back of the camera body 11. As shown in FIG. 3, the display 19 comprises an LCD 19a and lenticules 19b. The LCD 19a displays line-shaped images of a left viewpoint image and line-shaped images of a right viewpoint image, which are arranged alternately. The lenticules 19b allow the line-shaped images of the left viewpoint image to be viewed by the left eye of the observer and the line-shaped images of the right viewpoint image to be viewed by the right eye of the observer. Thereby the observer observes an image with stereoscopic effect.

Note that a parallax barrier system or a system with a different polarizing direction for each viewpoint image may be used for the 3D display. In the parallax barrier system, the line-shaped images of the left viewpoint image are observed with the left eye of the observer and the line-shaped images of the right viewpoint image are observed with the right eye of the observer through slits formed between parallax barriers arranged at predetermined intervals.

In the imaging mode, the display 19 functions as an electronic viewfinder and displays a through image. The through image is parallax images being captured and displayed continuously. The through image is also displayed in 3D. Thereby a camera operator observes a subject image with stereoscopic effect. When a captured image is reproduced, a parallax image is reproduced in 3D on the display 19 based on image data recorded in the memory card 18.

When an image is displayed in 3D, the display 19 displays guide displays 20a and 20b. The guide display 20a displays a currently-set distance (hereinafter referred to as the convergence point distance) R to a convergence point at which the parallax does not occur. The guide display 20b indicates a unit amount Δ of change in the convergence point distance relative to a unit operation amount of parallax adjustment, which will be described below. In this example, the display 19 displays that the convergence point distance R is 8 m and the unit amount of change is 1 m.

An operation unit 21 is composed of the above-described shutter release button 15, the power switch 16, the mode dial 17, a zoom button 22, a menu button 23, and keys 24a to 24d and 25. The zoom button 22, the menu button 23, and the keys 24a to 24d and 25 are provided on the back of the camera body 11.

The zoom button 22 is used for zooming. With the operation of the zoom button 22, the focal lengths of the taking lenses 12a and 13a are increased or reduced in response to the operation. In zooming, the taking lenses 12a and 13a are controlled such that the focal length of the taking lens 12a is the same as the focal length of the taking lens 13a.

The menu button 23 is operated when a setting screen for setting operation of the 3D camera 10 and the like is displayed on the display 19. An item displayed on the setting screen is chosen or a set value is increased or reduced by operating the keys 24a to 24d. The enter key 25 is operated to enter the settings set on the setting screen or the like.

In the imaging mode, the up key 24a and the down key 24b work as an operation unit for adjusting the parallax of a parallax image. The convergence point distance is used as a parameter in the parallax adjustment. The parallax of the parallax image is controlled such that the convergence point distance changes by an amount which is proportionate to an operation amount of the up key 24a or the down key 24b. In other words, a distance which is obtained by increasing or decreasing the current convergence point distance R by an amount proportionate to the operation amount of the up key 24a or the down key 24b is set as the new convergence point distance R. Thereby the stereoscopic effect of the parallax image displayed on the display 19 is changed linearly relative to the operation amount, avoiding discomfort of the observer.

In this example, the convergence point distance is increased or reduced by pressing operation of the up key 24a or the down key 24b. The number of presses or pressing time may be used as an operation amount. For the sake of simplifying the description, the convergence point distance is increased or reduced in accordance with the number of presses.

A pressing operation of the up key 24a is an increasing operation for increasing the convergence point distance. The single pressing operation of the up key 24a increases the convergence point distance by a predetermined unit amount Δ of change. A pressing operation of the down key 24b is a reducing operation for reducing the convergence point distance. The single pressing operation of the down key 24b reduces the convergence point distance by a predetermined unit amount Δ of change. In this example, the unit amount Δ of change is 1 m. The convergence point distance is incremented or decremented by 1 m.

Note that the operation unit for increasing and decreasing the convergence point distance is not limited to parts to be pressed such as the up key 24a and the down key 24b. For example, the convergence point distance may be increased or reduced with a slide operation of a slide-type knob or rotation of a dial. In this case, a slide amount of the knob or a rotation amount of the dial may be used as the operation amount. The keys, the knob, or the like for increasing or decreasing the convergence point distance may be displayed on a touch panel display. The convergence point distance may be increased or reduced with a touch operation on the display.

In this example, the unit amount Δ of change in the convergence point distance relative to the single pressing operation is 1 m. The unit amount Δ of change is not limited to 1 m and may be set as necessary. For example, the unit amount Δ of change in the convergence point distance relative to the single pressing operation may be set as necessary through a setting screen. The unit amount Δ of change for increasing the convergence point distance may differ from the unit amount Δ of change for reducing the convergence point distance.

In FIG. 3, the operation unit 21 transmits an operation signal to a CPU 30. The operation signal corresponds to an operation of the operation member such as the button or the switch. The CPU 30 controls each section based on the corresponding operation signal from the operation unit 21. A ROM 30a and a RAM 30b are connected to the CPU 30. A program for executing an imaging sequence, a program for adjusting parallax, and the like are stored in the ROM 30a. The CPU 30 controls each section based on the program stored in the ROM 30a. The RAM 30b is used as a working memory for temporarily storing data necessary for executing each sequence.

In this example, an imaging section is composed of the left imaging system 12 and the right imaging system 13. The left imaging system 12 is composed of the taking lens 12a, a lens driver 33, a lens sensor section 34, an image sensor 35, a timing generator 36, an AFE (analog front end) 37, and the like.

The lens driver 33 moves a variable power lens and a focus lens, which constitute the taking lens 12a, in an optical axis direction and thereby performs zooming and focusing of the taking lens 12a. The lens sensor section 34 detects a lens position of the variable power lens and a lens position of the focus lens. The lens sensor section 34 obtains a focal length of the taking lens 12a based on the position of the variable power lens. The lens sensor section 34 obtains a subject distance based on the position of the focus lens. The focal length and the subject distance are transmitted to the CPU 30 and used for controlling various sections.

The image sensor 35 is disposed behind the taking lens 12a. The image sensor 35 captures the left viewpoint image. Subject light passed through the taking lens 12a is incident on a light receiving surface 35a of the image sensor 35. As is well known, a plurality of pixels 35b (see FIG. 5) are arranged in matrix on the light receiving surface 35a. The pixels 35b photoelectrically convert the respective sections of the image. The image sensor 35 is driven by various drive signals from timing generator 36. The image sensor 35 converts the subject image, which is formed on the light receiving surface 35a by the taking lens 12a, into an electric analog signal and outputs it as the left viewpoint image. The left viewpoint image is transmitted from the image sensor 35 to the AFE 37.

The AFE 37 is composed of a CDS (correlated double sampling) circuit, an AGC (automatic gain control amplifier) circuit, and an A/D converter. The CDS circuit performs correlated double sampling to remove noise from the analog signal from the image sensor 35. The AGC circuit amplifies the analog signal with a gain that corresponds to imaging sensitivity set by the CPU 30. The A/D converter performs digital conversion of the left viewpoint image, being the analog signal from the AGC circuit, and outputs the digitally converted left viewpoint image.

The configuration of the right imaging system 13 is the same as that of the left imaging system 12. The right imaging system 13 is composed of the zoom-type taking lens 13a, which is the same as the left taking lens 12a, a lens driver 43, a lens sensor section 44, an image sensor 45 having a light receiving surface 45a and pixels 45b, a timing generator 46, an AFE 47, and the like, and outputs a digitally converted right viewpoint image.

The left viewpoint image and the right viewpoint image from the respective left and right imaging systems 12 and 13 are transmitted to an image input controller 51. The image input controller 51 controls input of each viewpoint image to a bus 52. The CPU 30, the image input controller 51, an image processing circuit 53, an AF detection circuit 54, an AE/AWB detection circuit 55, an image shifting section 56, a 3D image producing circuit 57, an LCD driver 58, a compression/decompression circuit 59, and a media controller 60 are connected to the bus 52. Each of these sections is controlled by the CPU 30 through the bus 52. These sections communicate data with each other through the bus 52.

The image processing circuit 53 performs various image processes such as tone conversion, white balance correction, gamma correction, YC conversion, and the like on each image from the image input controller 51. The AF detection circuit 54 calculates an AF evaluation value that is obtained by integrating high frequency components in each frame of one of the viewpoint images, for example, the left viewpoint image from the image input controller 51. The CPU 30 controls the lens driver 33 based on the AF evaluation value from the AF detection circuit 54 and focuses the taking lens 12a such that the AF evaluation value reaches a maximum, namely, the subject is in-focus. During focusing, the CPU 30 refers to each focus lens position from the lens sensor sections 34 and 44 and controls the lens driver 43 to focus the taking lens 13a such that taking lens 13a focuses at the same subject distance as that of the taking lens 12a.

The AE/AWB detection circuit 55 detects subject brightness and calculates a WB evaluation value, which is used for the white balance correction, based on the left viewpoint image, for example. Based on subject brightness information from the AE/AWB detection circuit 55, the CPU 30 controls the timing generators 36 and 46 and the AFEs 37 and 47 to control exposure of each of the imaging systems 12 and 13, for example, to increase or reduce an electronic shutter speed (charge storage time) of the image sensor and a gain of the AGC circuit. Based on the WB evaluation value from the AE/AWB detection circuit 55, the CPU 30 controls the image processing circuit 53 to make the white balance of the subject appropriate.

The left viewpoint image and the right viewpoint image, which have been subjected to the image processes in the image processing circuit 53, are inputted to the image shifting section 56. The image shifting section 56 shifts a cut out region in a left-right direction in each of the viewpoint images and thereby changes the parallax. For this reason, each viewpoint image is captured with the size larger in the left-right direction than the size actually used. Thus, each viewpoint image with the parallax adjusted by shifting the cut out region in the left-right direction is produced. The CPU 30 sets an amount of shift of the cut out region. Note that, in the descriptions below, an image cut out by the image shifting section 56 is referred to as the viewpoint image or the parallax image. An image before cutting is referred to as the original viewpoint image or the original parallax image.

The 3D image producing circuit 57 performs 3D display processing on the parallax-adjusted left and right viewpoint images. In this example, the 3D display processing corresponds to a 3D display of a lenticular system. The 3D display processing is performed such that each viewpoint image is divided into line-shaped (stripe-like shaped) images, which have line-like shapes, and the line-shaped images of the left viewpoint image and the line-shaped images of the right viewpoint image are arranged alternately and a pair of the line-shaped image of the left viewpoint image and the line-shaped image of the right viewpoint image is displayed on the LCD 19a, under each lenticule 19b.

The parallax image, which has been subjected to the 3D display processing, is transmitted to the LCD driver 58. The LCD driver 58 drives and allows the display 19 to display the parallax image. The parallax image is displayed in 3D. In the imaging mode, the 3D display processing is performed on the through image (moving images) successively captured.

The compression/decompression circuit 59 compresses the parallax image, being still images captured by operating the shutter release button 15. The media controller 60 records the compressed parallax image in the memory card 18. When the compressed parallax image is recorded in the memory card 18, information necessary for increasing or reducing the convergence point distance by a distance proportionate to the operation amount of the up key 24a or the down key 24b at the time of parallax adjustment during reproduction is recorded in addition to the parallax image. For example, the information is recorded in a tag of an image file. The information to be recorded includes, for example, the convergence point distance at the time of image capture, the focal length of the taking lens, the distance (base length) between the taking lenses 12a and 12b, a pitch of pixels 35b and pixels 45b.

At the time of reproduction of the images, the compression/decompression circuit 59 decompresses the parallax image recorded in the memory card 18. The decompressed parallax image is transmitted to the LCD driver 58 through the 3D image producing circuit 57 and thereby displayed in 3D on the display 19. The media controller 60 records an image in the memory card 18 and reads out an image from the memory card 18.

Figure 4:
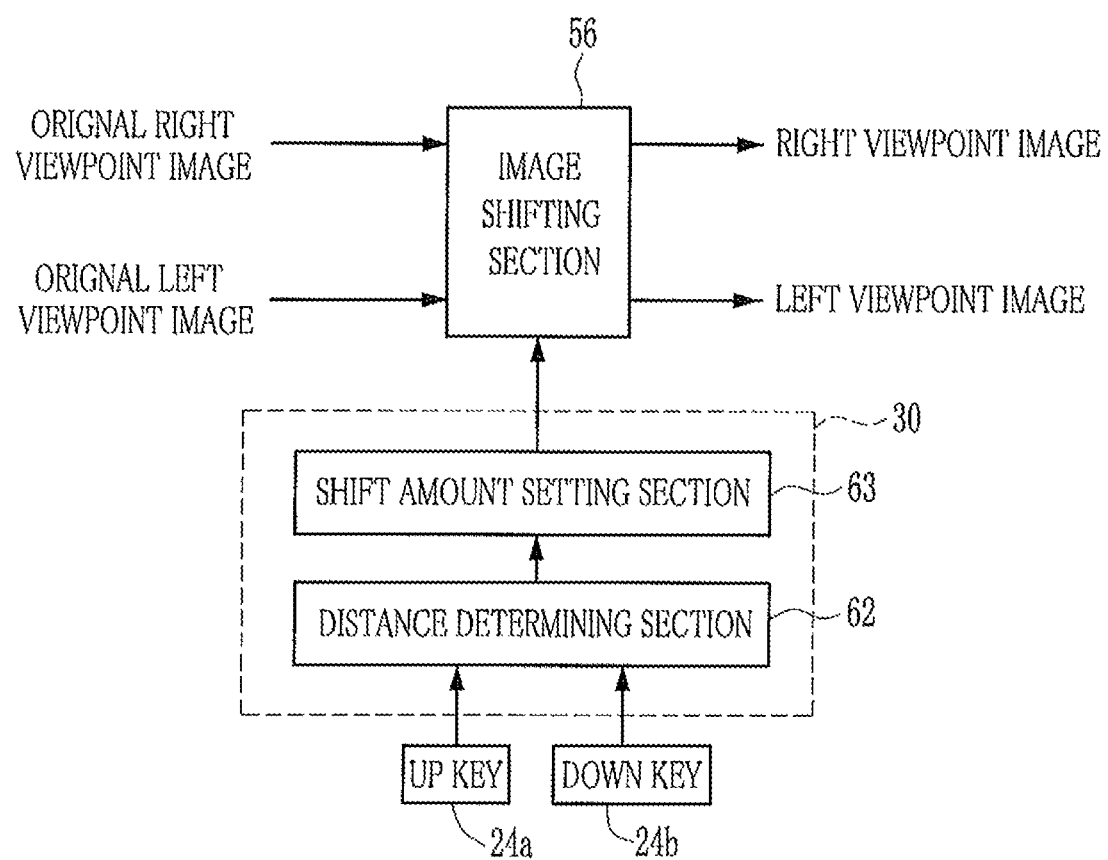
FIG. 4 is a block diagram illustrating functions of a CPU.

In FIG. 4, the CPU 30 functions as a distance determining section 62 and a shift amount setting section 63. A first operation signal that corresponds to the operation amount of the up key 24a or the operation amount of the down key 24b is inputted to the distance determining section 62. The distance determining section 62 determines a target convergence point distance (a convergence point distance to be set) $R_1$. The distance proportionate to the first operation signal is added to or subtracted from the current convergence point distance R to obtain the target convergence point distance $R_1$. In this example, the distance determining section 62 increments or decrements the current convergence point distance R, being an initial value, by 1 m per pressing operation of the up key 24a or the down key 24b to obtain the target convergence point distance $R_1$. To be more specific, the distance determining section 62 increments the target convergence point distance $R_1$ by 1 m (=unit amount Δ of change) from the current convergence point distance R, being an initial value, per single pressing operation of the up key 24a. The distance determining section 62 decrements the target convergence point distance $R_1$ by 1 m per single pressing operation of the down key 24b.

The shift amount setting section 63 sets a shift amount, which is an amount for shifting the cut out region, to the image shifting section 56. The shift amount corresponds to a change amount (distance to be added or subtracted) ΔR necessary to reach the target convergence point distance $R_1$ from the current convergence point distance R. The target convergence point distance $R_1$ is obtained by the distance determining section 62. In this example, a shift amount of the cut out region from a specific reference position is set to the image shifting section 56. The shift amount corresponds to the change amount (distance to be added or subtracted) ΔR. To be more specific, a position of the cut out region which corresponds to a reference convergence point distance $R_0$ is used as the reference position (shift amount ΔP=0). The reference convergence point distance $R_0$ is previously set to the 3D camera 10. The shift amount ΔP from the reference position is obtained as the shift amount ΔP which corresponds to the target convergence point distance $R_1$, and the obtained shift amount ΔP is set to the image shifting section 56. The image shifting section 56 shifts each cut out region by the shift amount ΔP from the reference position, and cuts out the viewpoint images in the shapes of the cut out regions from the original viewpoint images, respectively.

Figure 5:
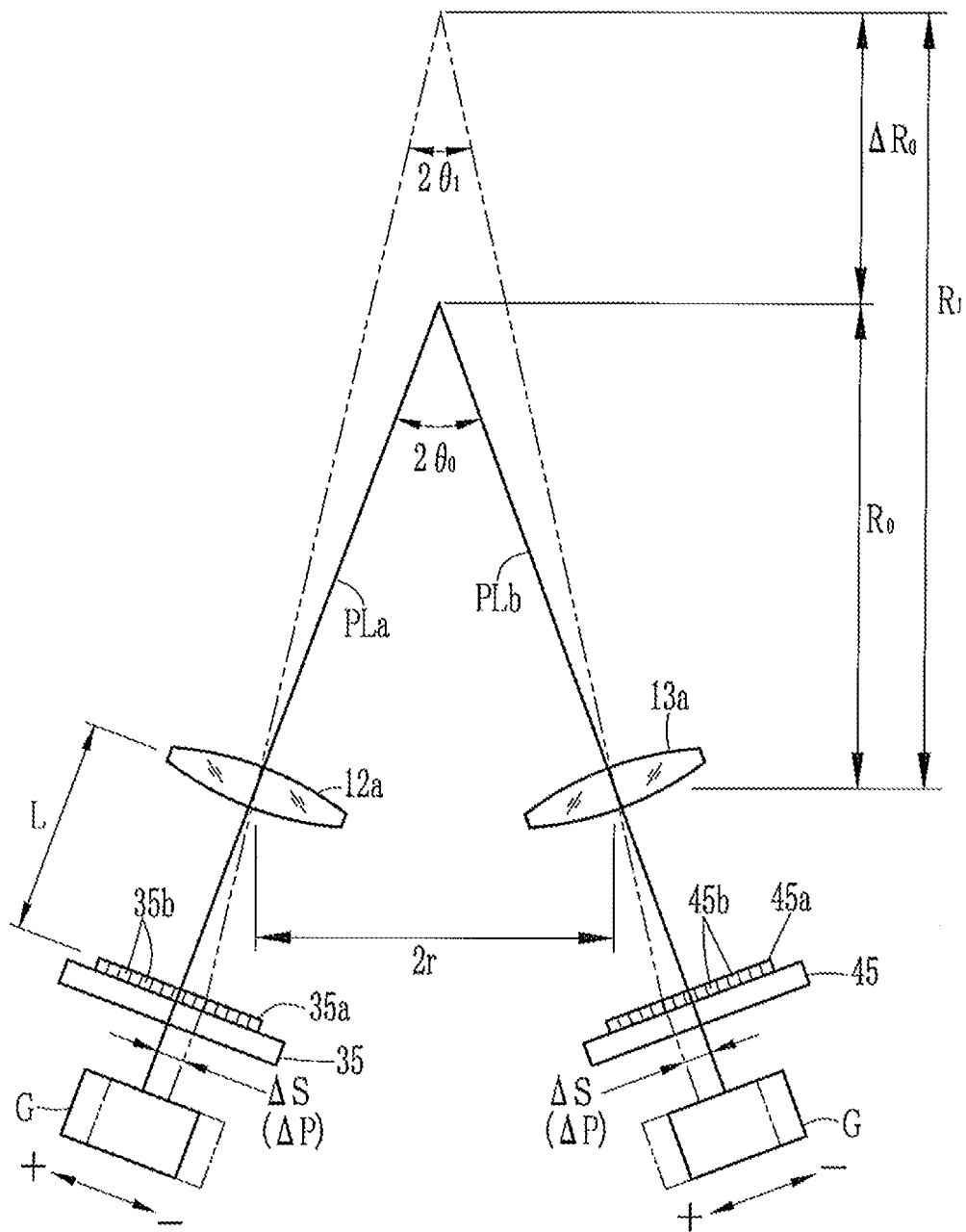
FIG. 5 is an explanatory view schematically illustrating a relationship between a convergence point distance and a shift amount.

As schematically shown in FIG. 5, the taking lenses 12a and 13a are tilted inward such that optical axes PLa and PLb cross each other at an angle of $2\theta_0$ in the position at the reference convergence point distance $R_0$. In the image sensor 35, the optical axis PLa of the taking lens 12a passes through the center position of the light receiving surface 35a. The light receiving surface 35a is disposed orthogonal to the corresponding optical axis PLa. The image sensor 45 is disposed in the same manner, relative to the optical axis PLb of the taking lens 13a.

In the image shifting section 56, "0" is provided as an initial value of the shift amount ΔP. Cut out regions G are in their reference positions when the shift amount ΔP is "0". When the cut out regions G are in their reference positions, the centers of the cut out regions G are coincident with the center positions of the light receiving surfaces 35a and 45a, that is, the center positions of the original left viewpoint image and the original right viewpoint image, respectively. In this state, the optical axis of the entire optical system of the imaging system 12 including the image sensor 35 is coincident with the optical axis PLa of the taking lens 12a. The optical axis of the entire optical system of the imaging system 13 including the image sensor 45 is coincident with the optical axis PLb of the taking lens 13a. An intersection of the optical axes PLa and PLb is coincident with a convergence point (convergence position). Hence, the convergence point distance in this state is the reference convergence point distance $R_0$. The convergence angle in this state is the angle of $2\theta_0$.

When the shift amount ΔP is increased or reduced with the operation of the up key 24a or the down key 24b and the cut out region G is shifted from the reference position, the inclination between the optical axis of the entire optical system of the left imaging system 12 and the optical axis of the entire optical system of the right imaging system 13 is increased or reduced. Thereby the convergence point distance is changed. As a result, the parallax is adjusted.

A shift amount (length) ΔS to shift the cut out region G from the reference position to achieve the target convergence point distance $R_1$ (=$R_0$+Δ$R_0$) is calculated using the following mathematical expression (1). The target convergence point distance $R_1$(=R+ΔR), which is obtained by increasing or reducing the current convergence point distance R by the change amount (distance to be added or subtracted) ΔR, is calculated as the target convergence point distance $R_1$ (=$R_0$+Δ$R_0$), which is obtained by increasing or reducing the reference convergence point distance $R_0$ by the change amount Δ$R_0$. In the mathematical expression (1), "r" represents a distance (length) where "2r" represents a distance between principal points between the taking lenses 12a and 13a and "L" represents the focal length of the taking lenses 12a and 13a. Note that the convergence angle at the target convergence point distance $R_1$ is represented by $2\theta_1$ where $\theta_1$ in the mathematical expression (1) is used. The focal length L of the taking lenses 12a and 13a is in the order of several tens millimeters, so that the distance between principal points is approximately used as the base length.

$$\Delta S = L/\tan(\theta_0 - \theta_1) \quad (1)$$

where $$\theta_0 = \tan^{-1}(r/R_0)$$

$$\theta_1 = \tan^{-1}(r/(R_0 + \Delta R_0))$$

The reference convergence point distance $R_0$ and the distance between principal points 2r which is used for obtaining the length r in the above mathematical expression (1) are previously known from respective design values or the like. The focal length L is obtained from the lens sensor sections 34 and 44. Thereby the shift amount ΔS for increasing the reference convergence point distance $R_0$ by the change amount $\Delta R_0$ to obtain the target convergence point distance $R_1$ is calculated.

The minimum unit of the shift amount ΔP shifted by the image shifting section 56 is the pixel pitch of each original viewpoint image. Here, the shift amount ΔP (the number of pixels) which corresponds to the shift amount ΔS is calculated using the following mathematical expression (2) where "p" denotes a pitch (pixel pitch) in a horizontal direction of pixels 35b, 45b arranged in two dimensions. Note that the shift amount ΔP needs to be an integer, so that fractions right to the decimal point are omitted or rounded up. It is preferable to omit or round up the fractions to reduce an error in the convergence point distance. For example, in the case where the number of pixels is converted or the like, the pixel pitch p which is obtained by converting the pixel pitch of the original viewpoint image into a length on the light receiving surface 35a or 45a is used.

$$\Delta P = \Delta S / p \quad (2)$$

Note that the sign of the above-described $\Delta R_0$ is positive when the target convergence point distance $R_1$ is greater than the reference convergence point distance $R_0$. The sign of the above-described $\Delta R_0$ is negative when the target convergence point distance $R_1$ is less than the reference convergence point distance $R_0$. When the sign is positive, the values ΔS and ΔP shift the left and right cut out regions G in directions to come close to each other. When the sign is negative, the values ΔS and ΔP shift the left and right cut out regions G in directions to move away from each other.

In this example, the shift amount ΔP from the reference position of the cut out region is obtained. The reference position of the cut out region corresponds to the reference convergence point distance $R_0$. The shift amount ΔP corresponds to the change amount ΔR from the current convergence point distance R to the target convergence point distance $R_1$. The shift amount ΔP is set to the image shifting section 56. Alternatively, the shift amount to be shifted may be obtained from the shifted position of the current cut out region G which corresponds to the current convergence point distance R. The obtained shift amount is set to the image shifting section 56. In this case, the image shifting section 56 shifts the cut out region G by the set shift amount from the current position. For example, the shift amount may be obtained from the difference between the shift amount ΔP which corresponds to the currently set convergence point distance R and the shift amount ΔP which corresponds to the target convergence point distance $R_1$. The difference is calculated using the mathematical expression (1). The shift amount ΔP which corresponds to the last target convergence point distance $R_1$ and which has been calculated last time may be stored and used as the shift amount ΔP which corresponds to the currently set convergence point distance R. The above-described configuration of the taking lenses 12a and 13a and the image sensors 35 and 45 is described by way of example and various types of configuration may be employed. For example, the taking lenses 12a and 13a may be arranged with the optical axes PLa and PLb parallel to each other. The light receiving surfaces 35a and 45a may be arranged vertical to the optical axes PLa and PLb, respectively. In this case, the light receiving surfaces 35a and 45a may be arranged such that the optical axes PLa and PLb pass through areas of the light receiving surfaces 35a and 45a away from their centers, respectively. Thereby a convergence angle is given.

Figure 6:
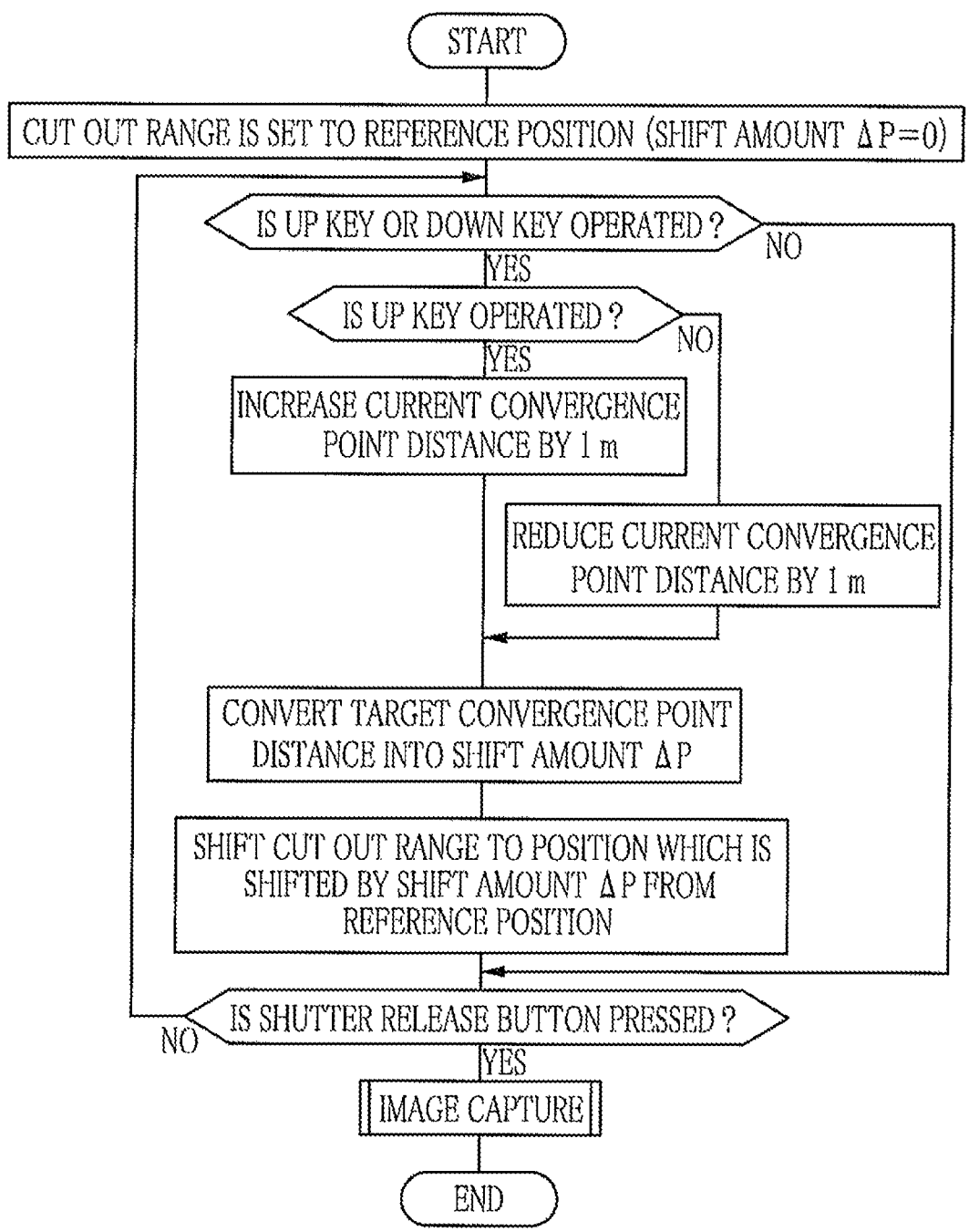
FIG. 6 is a flowchart illustrating a procedure of parallax adjustment.

Referring to FIG. 6, an operation of the above configuration is described. In order to capture a parallax image, the power is turned on and then the mode dial 17 is operated to set the 3D camera 10 to the imaging mode. When the 3D camera is set to the imaging mode, each section is set to an initial setting and then each of the imaging systems 12 and 13 starts capturing a through image.

In the left imaging system 12, the image sensor 35 starts capturing an original left viewpoint image through the taking lens 12a. The original left viewpoint image from the left imaging system 12 is digitally converted through the AFE 37 and transmitted to the image processing circuit 53, the AF detection circuit 54, and the AE/AWB detection circuit 55 through the image input controller 51 and the bus 52. In a similar manner, the right imaging system 13 starts image capture. The image sensor 45 captures an original right viewpoint image (through image) through the taking lens 13a. The original right viewpoint image from the right imaging system 13 is transmitted to the image processing circuit 53 through the AFE 47, the image input controller 51, and the bus 52.

The AF evaluation value obtained from the original left viewpoint image is transmitted from the AF detection circuit 54 to the CPU 30. Under the control of the CPU 30, the lens driver 33 is driven based on the AF evaluation value and focusing of the taking lens 12a is performed such that the subject being captured is in focus. In synchronization with the focusing of the taking lens 12a, the lens driver 43 of the right imaging system 13 is driven and thereby focusing of the taking lens 13a is performed. Thus each of the imaging systems 12 and 13 is in focus at the same distance. The focusing is performed whenever necessary, so that the focus is adjusted as the subject distance changes.

Based on the original left viewpoint image, the AE/AWB detection circuit 55 detects the subject brightness and calculates the WB evaluation value. Based on the subject brightness, the exposure control of each of the imaging systems 12 and 13 is performed. The WB evaluation value for the white balance correction is set to the image processing circuit 53. Based on the WB evaluation value, the white balance correction is performed. The subject brightness and the WB evaluation value are calculated as the subject brightness or the light source is changed, in a manner similar to the AF evaluation value. Thereby the exposure and the white balance of the subject being captured are controlled to be appropriate.

The original viewpoint images from the respective imaging systems 12 and 13 are subjected to various image processes in the image processing circuit 53 and then transmitted to the image shifting section 56. In the image shifting section 56, the shift amount ΔP is initially set to "0", so that the cut out region is in the reference position. Hence, the left viewpoint image is cut out in a state that the center position of the cut out region is coincident with the center position of the original left viewpoint image. Similarly, the right viewpoint image is cut out in a state that the center position of the cut out region is coincident with the center position of the original right viewpoint image. Each of the cut out viewpoint images is transmitted to the 3D image producing circuit 57.

When the parallax image, which is composed of the left and right viewpoint images produced as described above, is inputted to the 3D image producing circuit 57, the 3D image producing circuit 57 divides each of the viewpoint images into line-like shapes and the line-shaped images of the left viewpoint image and the line-shaped images of the right viewpoint image are arranged alternately in accordance with the pitch of the lenticules or lenticular lenses. Thus, the parallax image is subjected to the 3D display processing and then transmitted to the display 19 through the LCD driver 58.

The original left viewpoint image and the original right viewpoint image are captured with the respective imaging systems 12 and 13 at a predetermined period. Every time the image shifting section 56 generates or cuts out a left viewpoint image and a right viewpoint image, a parallax image is produced from the viewpoint images by the 3D display processing. The parallax images are transmitted to the LCD driver 58 successively and displayed on the display 19. Thereby the observer observes a stereoscopic through image on the display 19. The guide displays 20a and 20b are superimposed on the through image on the display 19. The guide displays 20a and 20b inform the observer of the current convergence point distance R and the unit amount Δ of change in the convergence point distance per operation.

As described above, in the initial setting, the change amount $\Delta_0$ is "0", so that the convergence point distance R is equal to the reference convergence point distance $R_0$. An image of the subject which is located at the reference convergence point distance $R_0$ has no parallax. Hence, in terms of impression of depth, the subject at the reference convergence point distance $R_0$ is observed as if it is situated on the display 19. The subject at a convergence point distance less than the reference convergence point distance $R_0$ is observed as if it is situated in front of the display 19. A subject at a convergence point distance greater than the reference convergence point distance $R_0$ is observed as if it is situated behind the display 19.

When the display 19 is observed and the stereoscopic effect is not suitable, for example, when a main subject is observed as if it is situated in front of or behind the display 19, the up key 24a or the down key 24b is operated to adjust the parallax.

For example, when the up key 24a is pressed once, the first operation signal which corresponds to the single pressing operation (increasing operation) is inputted to the distance determining section 62. The distance determining section 62 increases the change amount $\Delta R_0$ by the unit amount $\Delta$ (=1 m) of change. Thereby the current convergence point distance R (in this case, the reference convergence point distance $R_0$) is increased by the distance of 1 m and thus the target convergence point distance $R_1$ is obtained. In other words, the target convergence point distance $R_1$ which is obtained by increasing the reference convergence point distance $R_0$ by the change amount $\Delta R_0$ is expressed as $R_1 (=R_0+\Delta R_0)$. The shift amount setting section 63 converts the target convergence point distance $R_1$ into the shift amount $\Delta P$. The shift amount $\Delta P$ is calculated using the mathematical expressions (1) and (2).

When the calculated shift amount $\Delta P$ is set to the image shifting section 56, the cut out region of the original left viewpoint image is shifted by the shift amount $\Delta P$ from the reference position. The cut out region of the original right viewpoint image is shifted by the shift amount $\Delta P$ from the reference position. The left viewpoint image and the right viewpoint image are cut out with the respective cut out regions and outputted. The cut out region corresponding to the original left viewpoint image is shifted in the right direction. The cut out region corresponding to the original right viewpoint image is shifted in the left direction.

The left and right viewpoint images which are cut out with the above-described newly-set cut out regions are subjected to the 3D display processing in the 3D image producing circuit 57, and then transmitted to the LCD driver 58. Thereby a stereoscopic image of the subject at the convergence point distance 1 m farther than the reference convergence point distance $R_0$, that is, at the target convergence point distance $R_1$ is displayed on the display 19 with no parallax. The guide display 20a is updated. The subject at the convergence point distance 1 m farther than the reference convergence point distance $R_0$ is observed as if it is situated on the display 19. A subject closer than the subject at the target convergence point distance $R_1$ is observed as if it is situated in front of the display 19. A subject farther than the subject at the target convergence point distance $R_1$ is observed as if it is situated behind the display 19.

Another pressing operation of the up key 24a increases $\Delta R_0$ by 1 m. In a manner similar to the above, the target convergence point distance $R_1$ which has been increased by 1 m from the current convergence point distance R is converted into the shift amount $\Delta P$. Each of the cut out region corresponding to the left viewpoint image and the cut out region corresponding to the right viewpoint image is shifted by the shift amount $\Delta P$ from the position of the corresponding reference cut out region. The cut out region corresponding to the left viewpoint image is shifted in the further right direction relative to the position which corresponds to when the up key 24a is pressed the first time. The cut out region corresponding to the right viewpoint image is shifted in the further left direction relative to the position which corresponds to when the up key 24a is pressed the first time. Thereby the impression of depth of the stereoscopic image on the display 19 changes such that the distance of the subject with no parallax is incremented by 1 m per pressing operation of the up key 24a.

When the down key 24b is pressed, the pressing operation (reducing operation) is inputted as the first operation signal to the distance determining section 62. Thereby, the current convergence point distance R is decremented by 1 m per pressing operation, to obtain the target convergence point distance $R_1$. The reduced target convergence point distance $R_1$ is converted into the shift amount $\Delta P$. The shift amount $\Delta P$ is set to the image shifting section 56. The cut out region corresponding to the left viewpoint image is shifted in the left direction. The cut out region corresponding to the right viewpoint image is shifted in the right direction. As a result, the impression of depth of the stereoscopic image changes such that the distance of the subject with no parallax is decremented by 1 m per pressing operation of the down key 24b.

Every time the up key 24a or the down key 24b is pressed once, the position of the subject with no parallax, namely, the convergence point distance changes by 1 m and thus the convergence point distance is increased or reduced by the distance proportionate to the operation amount. Thus the change in the impression of depth in response to the operation does not provide discomfort.

As described above, the up key 24a and the down key 24b are operated to adjust the parallax. A stereoscopic still image is captured by pressing the shutter release button 15 after composition is determined. When the shutter release button 15 is pressed, focusing and exposure are adjusted based on the AF evaluation value, the AE evaluation value, or the like. Then the image sensors 35 and 45 capture the respective original left viewpoint image and the original right viewpoint image. The original left viewpoint image and the original right viewpoint image, which are outputted from the respective image sensors 35 and 45, are transmitted to the image shifting section 56 through the AFE 37 and 47, the image input controller 51, and the image processing circuit 53.

In the image shifting section 56, the left viewpoint image and the right viewpoint image are cut out based on the cut out regions from the original left viewpoint image and the original right viewpoint image, respectively. Thereby the parallax image composed of the left viewpoint image and the right viewpoint image is produced. The cut out regions are set when the shutter release button 15 is pressed. The parallax image is subjected to data compression in the compression/decompression circuit 59 and then transmitted to the media controller 60. In the media controller 60, the information necessary for the parallax adjustment is added to the compressed parallax image. Thereafter the compressed parallax image is recorded in the memory card 18.

When the mode is set to the reproduction mode, the parallax image is read out from the memory card 18. The parallax image is decompressed in the compression/decompression circuit 59 and then transmitted to the LCD driver 58 through the 3D image producing circuit 57. Thereby, the parallax image is displayed in 3D on the display 19. The convergence point distance at the time of the image capture, the focal length of the taking lens, the base length, and the pixel pitch, which have been recorded along with the parallax image, are read out and transmitted to the CPU 30.

In the case of the reproduction display, the parallax of the parallax image to be observed is adjusted by shifting each viewpoint image in the left-right direction on the display 19. In this case, the decompressed parallax image is inputted to the image shifting section 56. As with the case of the through image, new viewpoint images are cut out from the inputted parallax image (the respective viewpoint images) and the cut out regions are shifted with the operation of the up key 24a and the down key 24b.

At the time of the reproduction, the distance determining section 62 uses the convergence point distance, which is obtained at the time of capturing the parallax image being reproduced, as an initial value. When the up key 24a is operated, the target convergence point distance is increased by 1 m per operation. When the down key 24b is operated, the target convergence point distance is reduced by 1 m per operation. Then the shift amount $\Delta P$ is calculated using the mathematical expressions (1) and (2). The shift amount $\Delta P$ is set to the image shifting section 56. When the mathematical expression (1) is used, the convergence point distance which is obtained at the time of capturing the parallax image is used as the reference convergence point distance $R_0$. The distance to be added or subtracted, which is increased or reduced by the operation of the up key 24a or the down key 24b, is substituted into $\Delta R_0$ and calculated. Note that the focal length of the taking lens, the base length, and the pixel pitch are read out from the memory card 18.

The cut out region is shifted in response to the operation of the up key 24a or the down key 24b as described above. The convergence point distance is incremented or decremented by 1 m, in proportion to the operation amount of the up key 24a or the down key 24b, also at the time of reproduction and thereby the parallax is adjusted.

In the reproduction display, note that the parallax may be adjusted by shifting the entire viewpoint image in the left-right direction, instead of shifting the cut out region. Instead of recording the left viewpoint image and the right viewpoint image, which are cut out with the cut out regions, in the memory card 18, the original left viewpoint image and the original right viewpoint image may be recorded in the memory card 18. At the time of the reproduction, the left viewpoint image and the right viewpoint image to be displayed are cut out with the cut out regions from the original left viewpoint image and the original right viewpoint image which are read out from the memory card 18, and the cut out regions are shifted to adjust the parallax.

[Second Embodiment]

Figure 7:
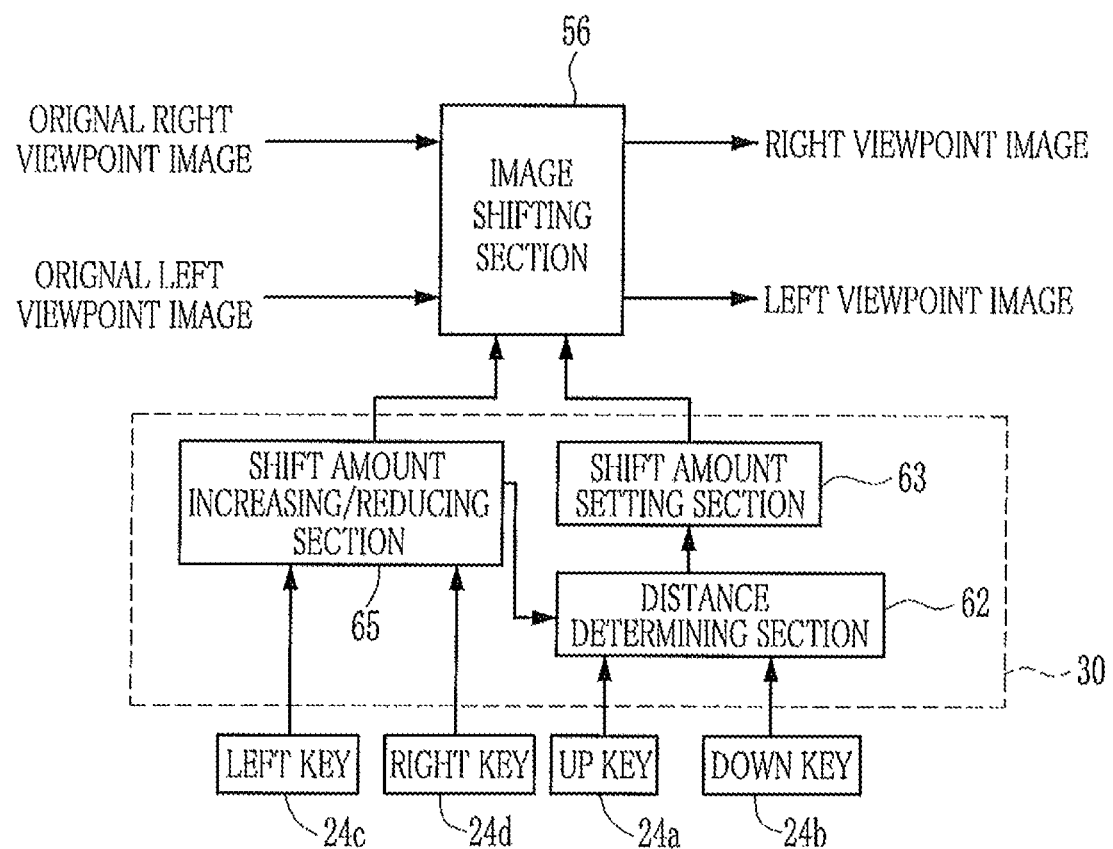
FIG. 7 is a block diagram illustrating the CPU's functions in a second embodiment, to which a function for increasing or reducing the shift amount by a unit of pixel is added.
Figure 8:
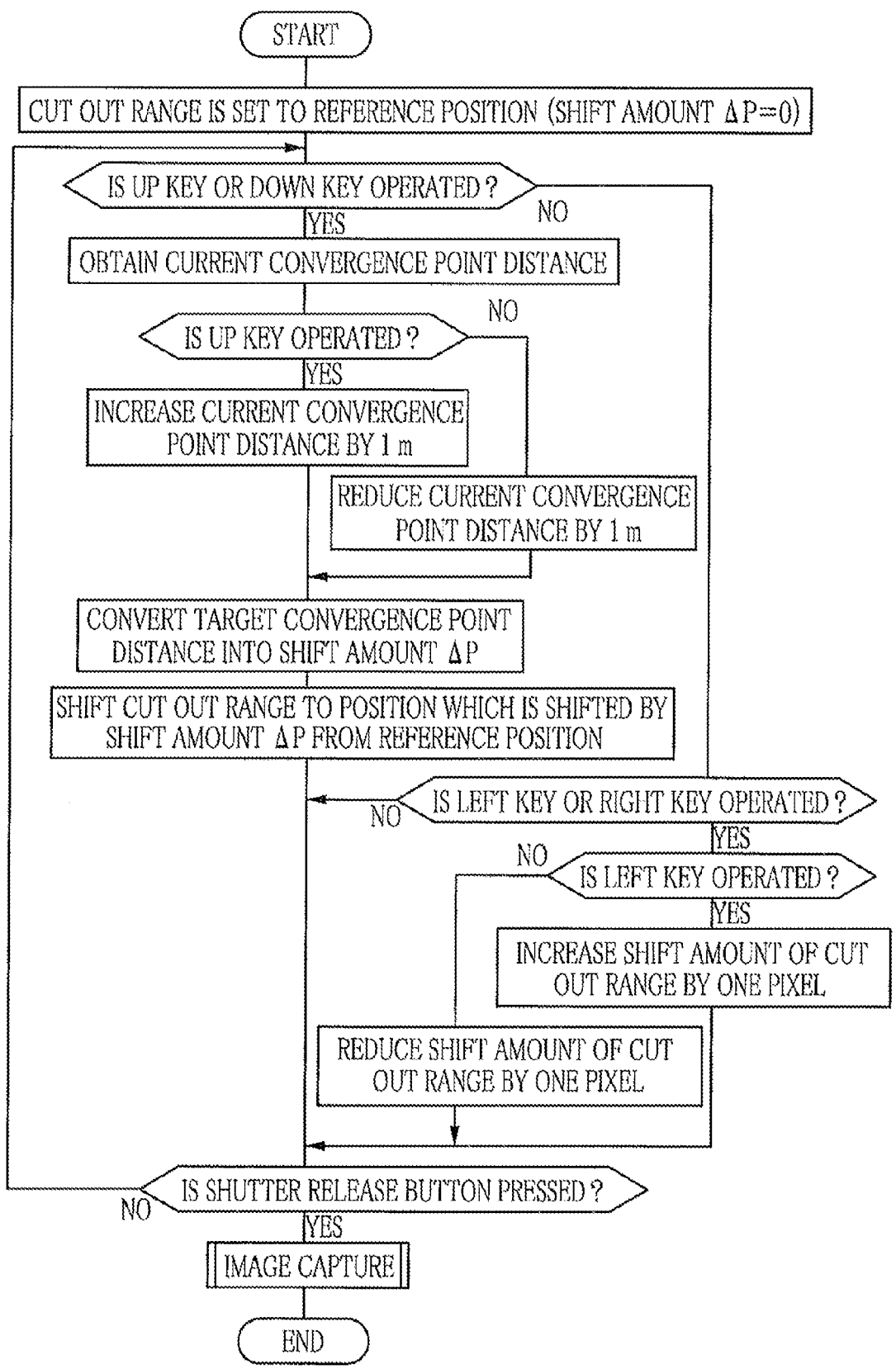
FIG. 8 is a flowchart illustrating a procedure of the parallax adjustment in the second embodiment.

In a second embodiment shown in FIGS. 7 and 8, the convergence point distance is changed by the distance proportionate to the operation amount and the shift amount of each viewpoint image is increased or reduced by a unit of pixel. Note that parts other than those described below are the same as those in the first embodiment, and the like parts have like numerals and descriptions thereof are omitted.

As shown in FIG. 7, the CPU 30 functions as the distance determining section 62, the shift amount setting section 63, and a shift amount increasing/reducing section 65. The up key 24a and the down key 24b constitute a first operation unit. A left key 24c and a right key 24d constitute a second operation unit. For example, the pressing operation of the left key 24c corresponds to the increasing operation for increasing the shift amount. The pressing operation of the right key 24d corresponds to the reducing operation for reducing the shift amount. A second operation signal that corresponds to the operation amount of the left key 24c or the right key 24d is inputted to the shift amount increasing/reducing section 65.

The shift amount increasing/reducing section 65 changes the shift amount $\Delta P$ by a unit of pixel, in proportion to the second operation signal. In other words, the shift amount increasing/reducing section 65 increments the shift amount by one pixel per pressing operation of the left key 24c and decrements the shift amount by one pixel per pressing operation of the right key 24d. Note that the change in the convergence point distance caused by shifting the cut out region by one pixel is not constant. The smaller the convergence point distance to be changed, the smaller the change in the convergence point distance caused by the shifting.

The shift amount increasing/reducing section 65 counts the increase and decrease (the number of pixels) $\alpha$ of the shift amount caused by the pressing operation of the left key 24c and the right key 24d. In the case where the up key 24a or the down key 24b is pressed after the pressing operation of the left key 24c or the right key 24d, the distance determining section 62 first increases or reduces the convergence point distance by a distance corresponding to the increase or decrease $\alpha$ to obtain the current convergence point distance R. The current convergence point distance R corresponds to the shift amount $\Delta P$ which has been increased or reduced with the operation of the left key 24c or the right key 24d. Then the current convergence point distance R, being the reference, is increased or reduced based on the pressing operation of the up key 24a or the down key 24b to calculate the target convergence point distance $R_1$. The shift amount increasing/reducing section 65 is reset after the increase or decrease $\alpha$ of the shift amount increasing/reducing section 65 is inputted to the distance determining section 62. When the left key 24c or the right key 24d is pressed again after the pressing operation of the up key 24a or the down key 24b, the target convergence point distance $R_1$ is then increased or reduced by a distance which corresponds to an increase or decrease $\alpha$ which is counted after the reset of the shift amount increasing/reducing section 65.

In this example, as shown in FIG. 8, the shift amount $\Delta P$ changes such that the convergence point distance increments or decrements by 1 m every time the up key 24a or the down key 24b is pressed, as with the first embodiment. The parallax is adjusted by cutting out the viewpoint images from the respective cut out regions which are shifted based on the shift amount $\Delta P$.

In the case of the pressing operation of the left key 24c or the right key 24d, for example, when the left key 24c is pressed once, the cut out region which has been shifted by the shift amount $\Delta P$ is further shifted by one pixel. The pressing operation of the left key 24c increases the shift amount, so that the cut out region is shifted in a direction to increase the convergence point distance. Namely, the cut out region corresponding to the original left viewpoint image is shifted by one pixel in the right direction. The cut out region corresponding to the original right viewpoint image is shifted by one pixel in the left direction.

When the right key 24d is pressed once, the cut out region which has been shifted by the shift amount ΔP is further shifted by one pixel to reduce the shift amount. The cut out region is shifted in a direction to reduce the convergence point distance. Namely, the cut out region corresponding to the original left viewpoint image is shifted by one pixel in the left direction. The cut out region corresponding to the original right viewpoint image is shifted by one pixel in the right direction.

When the up key 24a or the down key 24b is pressed after the operation of the left key 24c or the right key 24d, the distance determining section 62 obtains the increase or decrease α from the shift amount increasing/reducing section 65. Then the distance determining section 62 increases or reduces the shift amount ΔP, which has been retained, by the increase or decrease α. Thereby the current shift amount ΔP is obtained. The distance determining section 62 uses the current shift amount ΔP to calculate the current convergence point distance R. Every time the up key 24a is pressed, the convergence point distance R, being an initial value, is incremented by 1 m to obtain the target convergence point distance $R_1$. Every time the down key 24b is pressed, the convergence point distance R, being an initial value, is decremented by 1 m to obtain the target convergence point distance $R_1$.

According to this example, for example, in the case where a main subject is at a near distance, the convergence point distance is changed, with the operation of the up key 24a or the down key 24b, to be close to the distance of the main subject. Then the convergence point distance is finely adjusted with the operation of the left key 24c or the right key 24d so as to make the convergence point distance equivalent to the distance of the main subject. In the case where the main subject is at a far distance, the convergence point distance is changed, with the operation of the left key 24c or the right key 24d, to be close to the distance of the main subject. Then the convergence point distance is finely adjusted with the operation of the up key 24a or the down key 24b so as to make the convergence point distance equivalent to the distance of the main subject.

[Third Embodiment]

In a third embodiment, the operation of the operation unit is switched, based on the focal length of the taking lens, between an operation for changing the convergence point distance and an operation for changing the shift amount by a unit of pixel. Note that parts other than those described are the same as those in the second embodiment, and like parts have like numerals and descriptions thereof are omitted.

Figure 9:
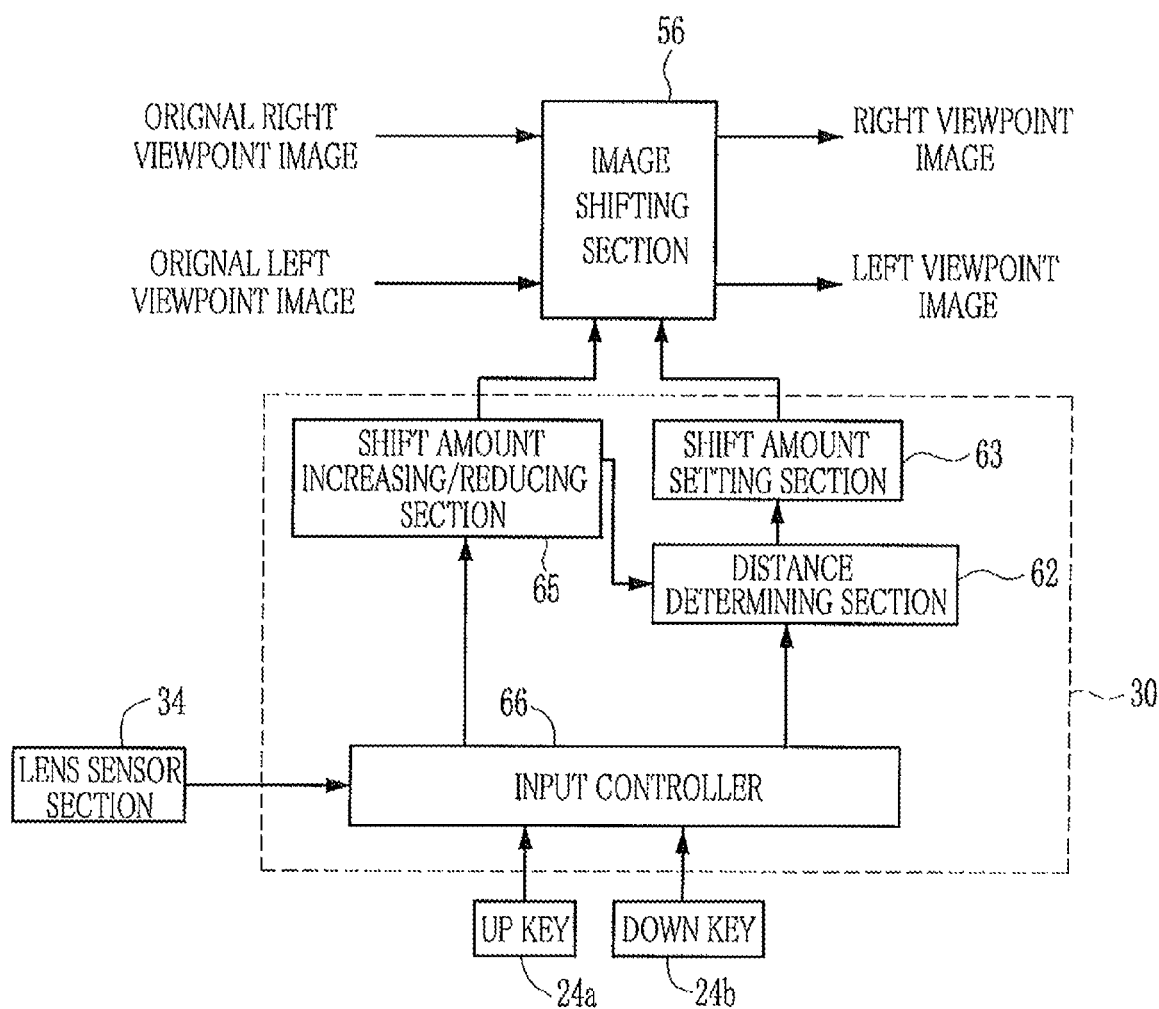
FIG. 9 is a block diagram illustrating a CPU's function to change settings for increasing/reducing the shift amount in accordance with a focal length in a third embodiment.

As shown in FIG. 9, the CPU 30 functions as the distance determining section 62, the shift amount setting section 63, the shift amount increasing/reducing section 65, and an input controller 66. The up key 24a and the down key 24b are used as the first operation unit. The first operation unit is used for the distance determining section 62 and the shift amount increasing/reducing section 65. The focal length of the taking lens 12a is inputted from the lens sensor section 34, being a focal length obtaining section, to the input controller 66. Note that the focal length of the taking lens 13a may be inputted from the lens sensor section 44 to the input controller 66.

Figure 10:
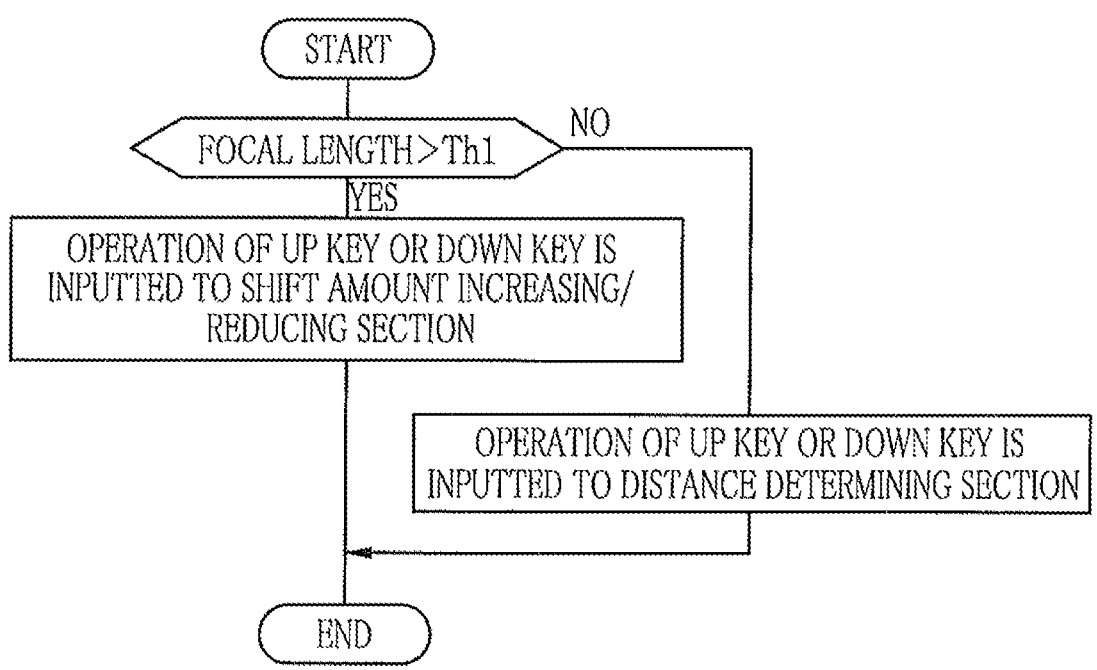
FIG. 10 is a flowchart illustrating a procedure for changing an input destination of parallax adjustment operation in the third embodiment.

As shown in FIG. 10, in the case where the focal length of the taking lens 12a is less than or equal to a predetermined focal length Th1, the above-described input controller 66 inputs the first operation signal, which is generated by the pressing operation of the up key 24a or the down key 24b, to the distance determining section 62. In the case where the focal length is greater than the predetermined focal length Th1, the input controller 66 inputs the first operation signal, which is generated by the pressing operation of the up key 24a or the down key 24b, is inputted to the shift amount increasing/reducing section 65.

According to this example, in the case where the taking lenses 12a and 13a are on the short focus side and it is assumed that the main subject is at a near distance, the parallax is adjusted by increasing or reducing the convergence point distance by the distance which is proportionate to the operation of the up key 24a or the down key 24b. In the case where the taking lenses 12a and 13a are on the long focus side and it is assumed that the main subject is at a far distance, the parallax is adjusted by increasing or reducing the shift amount of the cut out region by the unit of pixel with the operation of the up key 24a or the down key 24b. Thereby the convergence point distance is relatively significantly changed.

Figure 11:
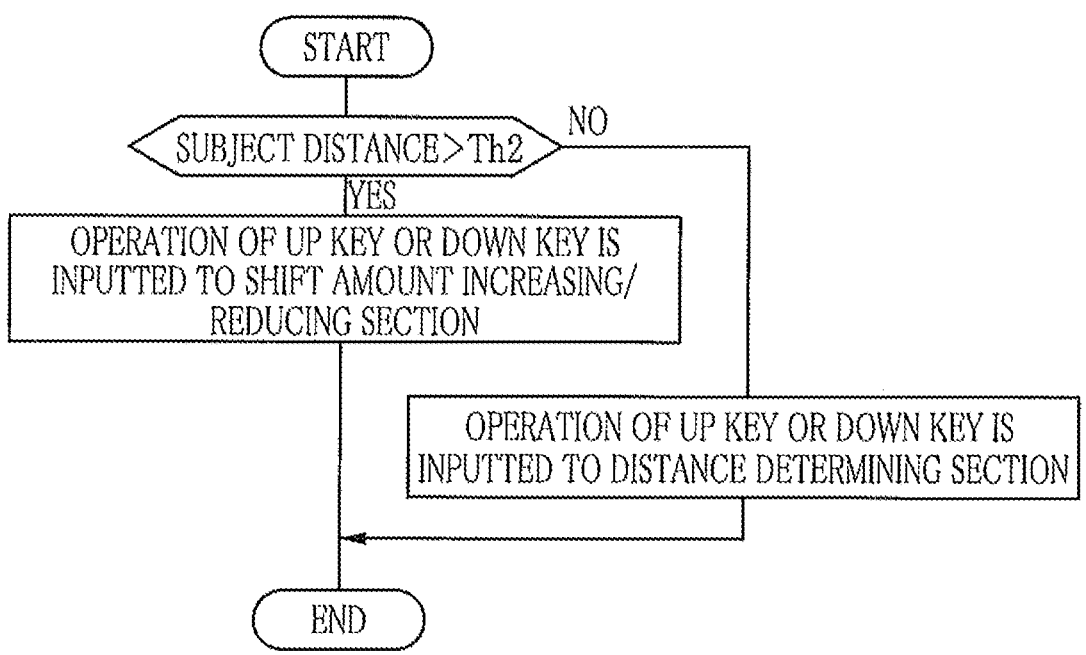
FIG. 11 is a flowchart illustrating a procedure for changing an input destination of the parallax adjustment operation based on a subject distance.

As shown in FIG. 11, note that an input destination of the first operation signal from the up key 24a or the down key 24b may be changed based on the subject distance instead of the focal length. In this case, when the subject distance is less than or equal to a predetermined subject distance Th2, the first operation signal from the up key 24a or the down key 24b is inputted to the distance determining section 62. When the subject distance is greater than the predetermined subject distance Th2, the first operation signal from the up key 24a or the down key 24b is inputted to the shift amount increasing/reducing section 65. Note that the subject distance is obtained from the focus lens position which is detected by the lens sensor section 34 or 44, for example.

Figure 12:
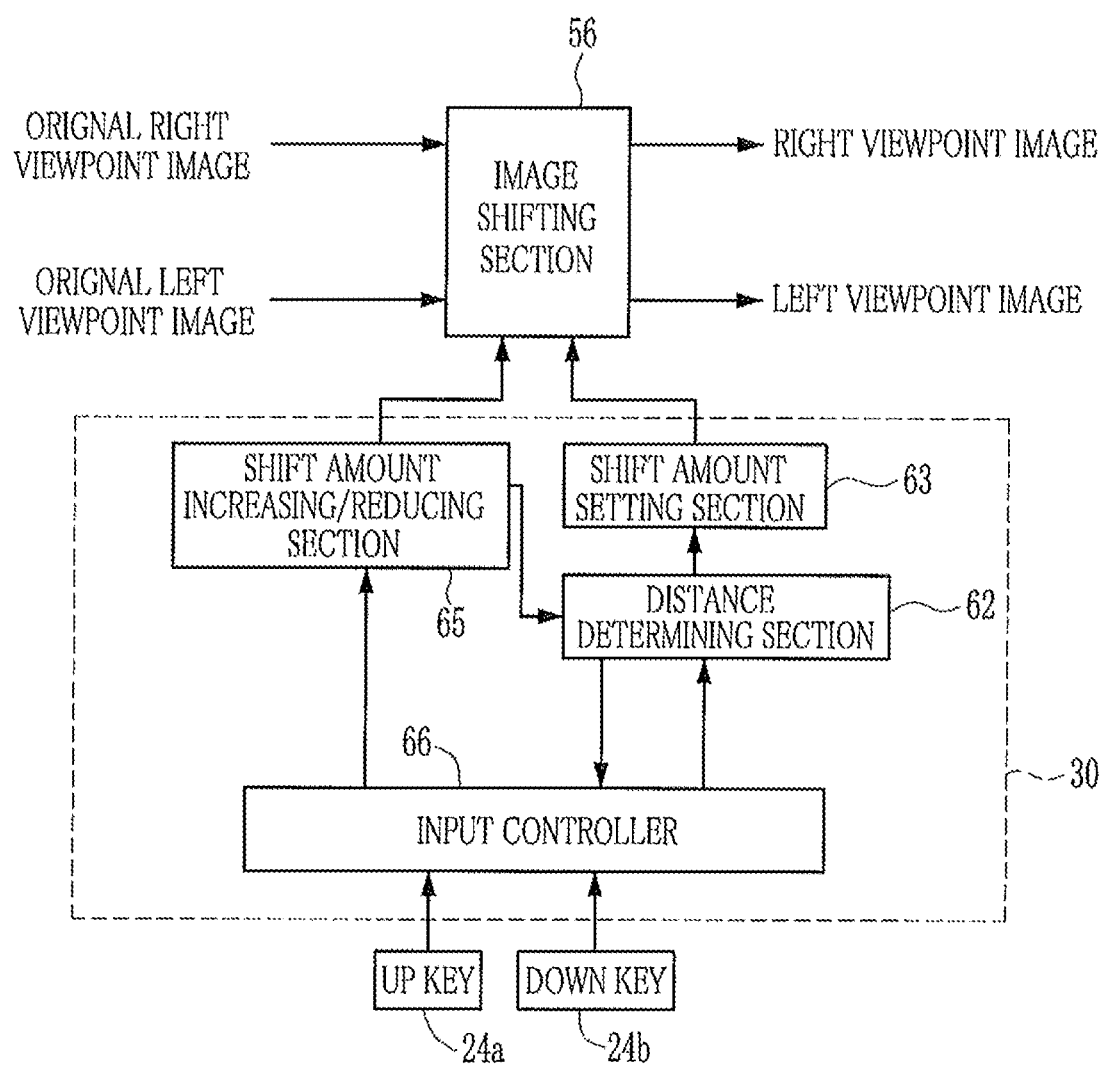
FIG. 12 is a block diagram illustrating the CPU's functions in an example in which settings for increasing/reducing the shift amount are changed in accordance with a convergence point distance.
Figure 13:
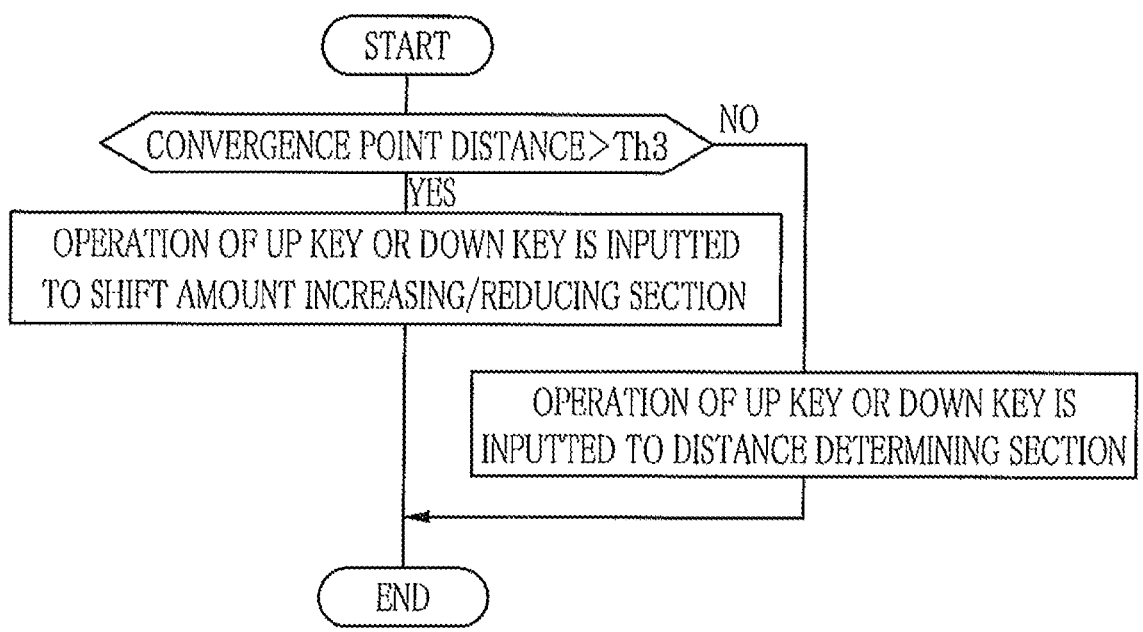
FIG. 13 is a flowchart illustrating a procedure for changing an input destination of the parallax adjustment operation in accordance with the convergence point distance.

As shown in FIGS. 12 and 13, the input destination of the first operation signal from the up key 24a or the down key 24b may be changed based on the convergence point distance R which is set at the time of operating the up key 24a or the down key 24b. The convergence point distance R which is set at the time of operating the up key 24a or the down key 24b is obtained from the distance determining section 62, for example. In this case, when the current convergence point distance R is less than or equal to a predetermined convergence point distance Th3, the first operation signal is inputted to the distance determining section 62. When the current convergence point distance R is greater than the predetermined convergence point distance Th3, the first operation signal is inputted to the shift amount increasing/reducing section 65.

In each of the above embodiments, a cut out region for cutting out apart of the viewpoint image (the original viewpoint image) is shifted in the left-right direction to shift the viewpoint image. A method for shifting the viewpoint image is not limited to this. For example, each of the entire captured viewpoint images may be shifted in the left-right direction. The left and right image sensors may be shifted in the left-right direction parallel to their respective light receiving surfaces. A display position of the viewpoint image may be shifted in the left-right direction.

The parallax is adjusted by shifting the viewpoint image. Alternatively, the parallax may be adjusted by rotating the entire imaging system composed of the taking lens and the image sensor, or by increasing or reducing the base length.

An automatic adjustment section for automatically adjusting the convergence point distance based on the subject distance, the arrangement of the subjects, or the like may be provided. The parallax is adjusted as in the above embodiments after the convergence point distance is automatically adjusted by the automatic adjustment section. A change amount of the convergence point distance per operation may be set as necessary. The change amount may be changed based on the convergence point distance or the like. The change amount of the convergence point distance may be increased or reduced as the convergence point distance increases, without incrementing or decrementing the shift amount by one pixel or the convergence angle by one degree.

An imaging apparatus which uses an imaging section having the left imaging system and the right imaging system to capture the respective left and right viewpoint images is described by way of example. The imaging section may take any structure so long as it is capable of capturing viewpoint images. For example, a large-sized image sensor may be used. Images formed through a pair of left and right taking lenses may be arranged side by side on a light receiving surface of the large-sized image sensor. An image sensor on which first type phase difference pixels and second type phase difference pixels are arranged alternately may be used to capture viewpoint images. Light from a left side is incident on the first type phase difference pixel. Light from a right side is incident on the second type phase difference pixel.

The reproduction of a parallax image with the 3D camera, being the image reproduction device, is described by way of example. The image reproduction device may be a viewer or the like having a reproducing function independently.

In the case where the parallax image is reproduced with the image reproduction device and the parallax of the parallax image being reproduced is changed automatically, the convergence point distance may be changed by an amount proportionate to the elapsed time. For example, when a scene is changed during the reproduction of a moving image, the convergence point distance is incremented or decremented by a predetermined distance per frame after the scene is changed. Thereby an appropriate convergence point distance is achieved. Thus, the convergence point distance does not change abruptly when the scene is changed. The stereoscopic effect changes without discomfort and the parallax is adjusted appropriately.

Various changes and modifications are possible in the present invention and may be understood to be within the present invention.

What is claimed is:

1. A parallax adjustment device comprising:
   a first operation unit for outputting a first operation signal based on an amount of operating the first operation unit;
   a distance determining section for determining a target convergence point distance based on the first operation signal, the target convergence point distance being determined by increasing or reducing a current convergence point distance by a distance proportionate to the amount of operating the first operation unit, a convergence point distance being a distance to a convergence point at which no parallax is caused;
   a shift amount setting section for setting a shift amount of each viewpoint image such that an amount to be shifted per unit amount of operating the first operation unit is nonlinearly increased or reduced in a direction of parallax of the each viewpoint image in accordance with a distance change from the current convergence point distance to the target convergence point distance; and
   an image shifting section for shifting the each viewpoint image by the shift amount and thereby changing the parallax.

2. The parallax adjustment device according to claim 1, further comprising a change amount display section for displaying an amount of change in the convergence point distance relative to the unit amount of operating the first operation unit.

3. The parallax adjustment device according to claim 1, further comprising:
   a second operation unit for outputting a second operation signal based on an amount of operating the second operation unit; and
   a shift amount increasing/reducing section for changing the shift amount by a unit of pixel, in proportion to the amount of operating the second operation unit based on the second operation signal.

4. An imaging apparatus comprising:
   the parallax adjustment device according to claim 1; and
   an imaging section for capturing a first viewpoint image and a second viewpoint image.

5. The imaging apparatus according to claim 4, further comprising:
   a zoom lens provided in the imaging section;
   a focal length obtaining section for obtaining a focal length of the zoom lens;
   a shift amount increasing/reducing section for changing the shift amount by a unit of pixel, in proportion to the amount of operating the first operation unit based on the first operation signal; and
   an input controller for inputting the first operation signal to the distance determining section in a case where the focal length obtained by the focal length obtaining section is less than or equal to a predetermined focal length and inputting the first operation signal to the shift amount increasing/reducing section in a case where the focal length is greater than the predetermined focal length.

6. The imaging apparatus according to claim 4, further comprising:
   a subject distance obtaining section for obtaining a subject distance;
   a shift amount increasing/reducing section for changing the shift amount by a unit of pixel, in proportion to the amount of operating the first operation unit based on the first operation signal; and
   an input controller for inputting the first operation signal to the distance determining section in a case where the subject distance obtained by the subject distance obtaining section is less than or equal to a predetermined subject distance and inputting the first operation signal to the shift amount increasing/reducing section in a case where the subject distance is greater than the predetermined subject distance.

7. The imaging apparatus according to claim 4, further comprising:
   a shift amount increasing/reducing section for changing the shift amount by a unit of pixel, in proportion to the amount of operating the first operation unit based on the first operation signal; and
   an input controller for inputting the first operation signal to the distance determining section in a case where a convergence point distance at the time of operating the first operation unit is less than or equal to a predetermined convergence point distance and inputting the first operation signal to the shift amount increasing/reducing section in a case where the convergence point distance at the time of operating the first operation unit is greater than the predetermined convergence point distance.

8. The imaging apparatus according to claim 4, further comprising:
- a second operation unit for outputting a second operation signal based on an amount of operating the second operation unit; and
- a shift amount increasing/reducing section for changing the shift amount by a unit of pixel, in proportion to the amount of operating the second operation unit based on the second operation signal.

9. The imaging apparatus according to claim 4, further comprising a change amount display section for displaying an amount of change in the convergence point distance relative to the unit amount of operating the first operation unit.

10. The imaging apparatus according to claim 4, wherein the image shifting section shifts a cut out region by the shift amount in the direction of parallax within each of original viewpoint images captured with the imaging section and cuts out the each cut out region and thereby produces each viewpoint image with adjusted parallax.

11. The imaging apparatus according to claim 4, further comprising a display section for displaying a through image in 3D, with the use of the each viewpoint image with the parallax adjusted by the image shifting section.

12. An image reproduction device comprising:
- the parallax adjustment device according to claim 1; and
- a display section for displaying the each viewpoint image in 3D with the parallax adjusted by the image shifting section.

13. A method for adjusting parallax comprising the steps of:
- determining a target convergence point distance based on a first operation signal, the target convergence point distance being determined by increasing or reducing a current convergence point distance by a distance proportionate to an amount of operating a first operation unit, the first operation signal being outputted from the first operation unit based on the amount of operating the first operation unit, a convergence point distance being a distance to a convergence point at which no parallax is caused;
- setting a shift amount of each viewpoint image such that an amount to be shifted per unit amount of operating the first operation unit is nonlinearly increased or reduced in a direction of parallax of the each viewpoint image in accordance with a distance change from the current convergence point distance to the target convergence point distance; and
- shifting the each viewpoint image by the shift amount and thereby changing the parallax.

14. The imaging apparatus according to claim 1, wherein the distance determining section makes an amount of change in the distance relative to the unit amount of operating the first operation unit when the distance is increased different from an amount of change in the distance relative to the unit amount of operating the first operation unit when the distance is reduced.

* * * * *